United States Patent
Fukumoto

(10) Patent No.: US 11,091,119 B2
(45) Date of Patent: Aug. 17, 2021

(54) GAS GENERATOR

(71) Applicant: DAICEL CORPORATION, Osaka (JP)

(72) Inventor: Kenji Fukumoto, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 20 days.

(21) Appl. No.: 16/635,291

(22) PCT Filed: Jul. 11, 2018

(86) PCT No.: PCT/JP2018/026200
§ 371 (c)(1),
(2) Date: Jan. 30, 2020

(87) PCT Pub. No.: WO2019/049507
PCT Pub. Date: Mar. 14, 2019

(65) Prior Publication Data
US 2020/0369235 A1    Nov. 26, 2020

(30) Foreign Application Priority Data
Sep. 5, 2017 (JP) .............................. JP2017-170198

(51) Int. Cl.
*B60R 21/26* (2011.01)
*B60R 21/264* (2006.01)
*B60R 21/261* (2011.01)

(52) U.S. Cl.
CPC ........ *B60R 21/2644* (2013.01); *B60R 21/261* (2013.01); *B60R 2021/26011* (2013.01)

(58) Field of Classification Search
CPC ........................................... B60R 2021/26011
See application file for complete search history.

(56) References Cited

U.S. PATENT DOCUMENTS 5,372,380 A     12/1994  Duffy et al.
6,189,925 B1 *   2/2001  Reichtalhammer ..........................
                                             B60R 21/2644
                                             280/736

(Continued)

FOREIGN PATENT DOCUMENTS

JP       2004-58984 A    2/2004
WO    WO 2010/079710 A1  7/2010

OTHER PUBLICATIONS

International Preliminary Report on Patentability the Written Opinion of the International Searching Authority, for International Application No. PCT/JP2018/026200, dated Mar. 19, 2020.

(Continued)

*Primary Examiner* — Ruth Ilan
(74) *Attorney, Agent, or Firm* — Birch, Stewart, Kolasch & Birch, LLP.

(57) ABSTRACT

A gas generator, including an igniter provided in a cylindrical housing, a combustion chamber filled with a gas generating agent, and being provided within the cylindrical housing; and a diffuser portion including a gas discharge port being coupled to the cylindrical housing, the diffuser portion including a bottom surface, a peripheral wall having the gas discharge port, and an opening, the diffuser portion including therein a cylindrical filter covering, from an inside of the diffuser portion, the gas discharge port, the cylindrical filter being disposed such that a first annular end face thereof abuts against the bottom surface of the diffuser portion and a second annular end face thereof is located to be on a side of the opening of the diffuser portion, the cylindrical filter having an annular inclined surface extending in an obliquely inward direction from the first annular end face, and a trapping space for trapping a combustion residue contained in the combustion gas being provided so as to be surrounded (Continued)

by the bottom surface of the diffuser portion and the annular inclined surface.

8 Claims, 4 Drawing Sheets

(56) References Cited

U.S. PATENT DOCUMENTS

| | | | |
|---|---|---|---|
| 6,257,617 B1* | 7/2001 | McFarland | B60R 21/261 |
| | | | 280/736 |
| 8,231,141 B2* | 7/2012 | Neumayer | B60R 21/2644 |
| | | | 280/741 |
| 10,696,267 B2* | 6/2020 | Fukumoto | B01J 7/00 |
| 2004/0066024 A1 | 4/2004 | Shioji et al. | |
| 2005/0046161 A1 | 3/2005 | Canterberry et al. | |
| 2011/0265678 A1 | 11/2011 | Sasamoto et al. | |
| 2013/0291756 A1* | 11/2013 | Ohsugi | B01J 7/00 |
| | | | 102/530 |
| 2019/0184931 A1* | 6/2019 | Prima | F42B 3/04 |
| 2020/0139926 A1* | 5/2020 | Bendel | B60R 21/2644 |
| 2020/0164327 A1* | 5/2020 | Fukumoto | B01J 7/00 |

OTHER PUBLICATIONS

International Search Report for International Application No. PCT/JP2018/026200, dated Sep. 11, 2018.

* cited by examiner

GAS GENERATOR

TECHNICAL FIELD

The present invention relates to a gas generator that can be used for an airbag device for a vehicle such as an automobile.

BACKGROUND ART

A widely used gas generator used for a device or the like for deploying an airbag on a side of a passenger uses a gas generating agent as a gas generation source. Combustion gas generated by combustion of the gas generating agent contains a high-temperature combustion residue derived from a metal component contained in the gas generating agent, and in a case where the combustion residue discharged from the gas generator flows out of the gas generator, an airbag may be damaged, hence, it is desirable to reduce an amount of the combustion residue discharged from the gas generator as much as possible.

JP 2004-058984 A discloses a technique for catching fragments of a rupture disc that are generated during operation.

SUMMARY OF INVENTION

A first aspect of the present invention (hereinafter referred to as "first aspect") is a gas generator including an igniter provided in a cylindrical housing of the gas generator, a combustion chamber filled with a gas generating agent to be ignited and burned by the igniter, and being provided within the cylindrical housing, and a diffuser portion including a gas discharge port for discharging combustion gas generated in the combustion chamber being coupled to the cylindrical housing. The diffuser portion has a cup shape and includes a bottom surface, a peripheral wall having the gas discharge port, and an opening.

The diffuser portion includes therein a cylindrical filter covering from an inside of the diffuser portion the gas discharge port. The cylindrical filter is disposed such that a first annular end face thereof abuts against the bottom surface of the diffuser portion and a second annular end face thereof axially opposite to the first annular end face is located to be on a side of the opening of the diffuser portion, and the cylindrical filter has an annular inclined surface extending in an obliquely inward direction from the first annular end face. In the gas generator, a trapping space for trapping a combustion residue contained in the combustion gas is provided so as to be surrounded by the bottom surface of the diffuser portion and the annular inclined surface.

A second aspect of the present invention (hereinafter referred to as "second aspect") is a gas generator including an igniter provided in a cylindrical housing of the gas generator, a combustion chamber filled with a gas generating agent to be ignited and burned by the igniter, and being provided within the cylindrical housing, and a diffuser portion including a gas discharge port for discharging combustion gas generated in the combustion chamber being coupled to the cylindrical housing. The diffuser portion has a cup shape and includes a bottom surface, a peripheral wall having the gas discharge port, and an opening, the diffuser portion further including a recess on an inner surface of the bottom surface. The diffuser portion includes therein a cylindrical filter covering, from an inside of the diffuser portion the gas discharge port. The cylindrical filter is disposed such that a first annular end face thereof abuts against the bottom surface of the diffuser portion and a second annular end face thereof axially opposite to the first annular end face is located to be on a side of the opening of the diffuser portion, the cylindrical filter including an annular surface extending radially inward from the first annular end face, and the annular surface including an inner peripheral edge that protrudes further inward than an inner peripheral surface of the recess. In the gas generator, a trapping space for trapping a combustion residue contained in the combustion gas is provided so as to be surrounded by the recess formed on the bottom surface of the diffuser portion and the annular surface.

A third aspect of the present invention (hereinafter referred to as "third aspect") is a gas generator including an igniter provided in a cylindrical housing of the gas generator, a combustion chamber filled with a gas generating agent to be ignited and burned by the igniter, and being provided within the cylindrical housing, and a diffuser portion including a gas discharge port for discharging combustion gas generated in the combustion chamber being coupled to the cylindrical housing. The diffuser portion has a cup shape and includes a bottom surface, a peripheral wall having the gas discharge port, and an opening. The diffuser portion includes therein a cylindrical filter covering from an inside of the diffuser portion the gas discharge port. The cylindrical filter is disposed such that a first annular end face thereof abuts against the bottom surface of the diffuser portion and a second annular end face thereof axially opposite to the first annular end face is located to be on a side of the opening of the diffuser portion.

A mesh-like formed body is disposed to abut against an inner peripheral surface on a side of the first annular end face of the cylindrical filter. The mesh-like formed body has a density smaller than a density of the cylindrical filter and forms a trapping space for trapping a combustion residue contained in the combustion gas.

A fourth aspect of the present invention (hereinafter referred to as "fourth aspect") is a gas generator including an igniter provided in a cylindrical housing of the gas generator, a combustion chamber filled with a gas generating agent to be ignited and burned by the igniter, and being provided within the cylindrical housing, and a diffuser portion including a gas discharge port for discharging combustion gas generated in the combustion chamber being coupled to the cylindrical housing. The diffuser portion has a cup shape and includes a bottom surface, a peripheral wall having the gas discharge port, and an opening.

The diffuser portion includes therein a cylindrical filter covering, from an inside of the diffuser portion the gas discharge port. The cylindrical filter is disposed such that a first annular end face thereof abuts against the bottom surface of the diffuser portion and a second annular end face thereof axially opposite to the first annular end face is located to be on a side of the opening of the diffuser portion.

In the cylindrical filter inside the diffuser portion, a dome body including an opening and a domed part formed with a plurality of through holes is provided such that the domed part faces inward of the diffuser portion and a lower end connecting the opening abuts against an inner peripheral surface on a side of the first annular end face of the cylindrical filter. In the gas generator, a trapping space for trapping a combustion residue contained in the combustion gas is provided so as to be surrounded by the bottom surface of the diffuser portion and the dome body.

BRIEF DESCRIPTION OF DRAWINGS

The present invention will be more fully understood from the detailed description given hereinbelow and the accompanying drawings, which are given for explanation only and do not limit the present invention.

DESCRIPTION OF EMBODIMENTS

Figure 1:
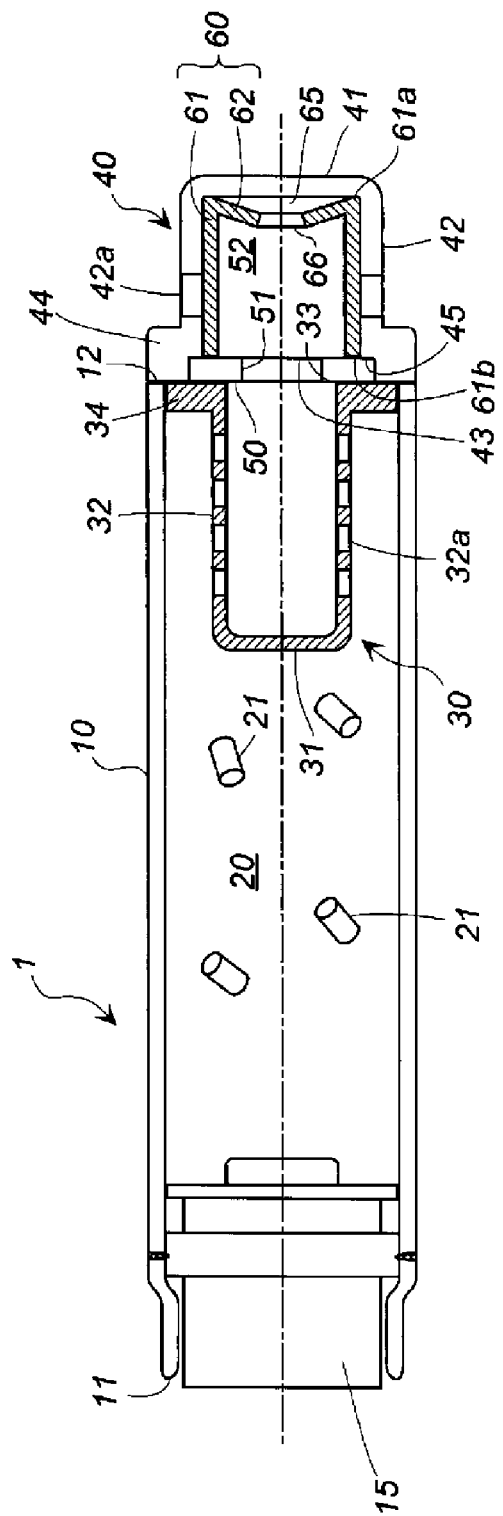
FIG. 1 is an axial cross-sectional view of a gas generator according to an embodiment of the present invention.

The present invention provides a gas generator excellent in performance of trapping a combustion residue derived from a metal component contained in combustion gas generated from a gas generating agent.

The gas generator according to the present invention includes a trapping space, which traps a combustion residue contained in combustion gas, inside a diffuser portion in which a cylindrical filter is disposed.

The gas generator according to the present invention can be applied not only to a pyro type gas generator using only a gas generating agent as a gas generation source, but also to a hybrid type gas generator using both a gas generating agent and a pressurized gas as a gas generation source. The same applies to gas generators according to second to fourth aspects described below.

The gas generator according to the present invention can be applied to a gas generator having one of modes of: a gas generator A in which an igniter is disposed on a side of a first end of a cylindrical housing, a diffuser portion is coupled to a second end on an opposite side to the first end, and a combustion chamber filled with a gas generating agent is disposed in an internal space of the cylindrical housing, a gas generator B in which a first igniter and a first combustion chamber filled with a first gas generating agent are disposed on a side of a first end of a cylindrical housing, a second igniter and a second combustion chamber filled with a second gas generating agent are disposed on a side of the second end of the cylindrical housing, and a diffuser portion is coupled to the cylindrical housing at an intermediate position thereof, and a gas generator C in which in the gas generator B, either of the first combustion chamber or the second combustion chamber is a pressurized gas chamber. The same applies to each of gas generators according to second to fourth aspects described below.

Note that the gas generator A may use a cylindrical housing in which the second end of the cylindrical housing is closed beforehand by a method such as deep drawing molding. In that case, a gas discharge port may be formed on a side of the closed second end to function as the diffuser portion.

A trapping space for trapping a combustion residue is a space surrounded by the annular inclined surface and the bottom surface of the diffuser portion.

The cylindrical filter includes a cylindrical main body and an annular inclined surface formed on a first annular end face of the cylindrical main body, and at the annular inclined surface, the first annular end face of the cylindrical main body may be preferably folded inward or an annular protrusion protruding inward may be formed, but the annular inclined surface may be formed by using a member, which differs from the first annular end face of the cylindrical main body, in combination.

The cylindrical main body may abut against an inner peripheral surface of a peripheral wall of the diffuser or may be separated therefrom (an annular space may be formed between the cylindrical main body and the diffuser peripheral wall).

The first annular end face (a boundary part between the cylindrical main body and the annular inclined surface) of the cylindrical filter abuts against the bottom surface of the diffuser portion, and thus, the annular inclined surface extends from the first annular end face in an obliquely inward direction of the diffuser portion. Thus, the trapping space for trapping a combustion residue, surrounded by the bottom surface of the diffuser portion and the annular inclined surface, communicates with an interior of the diffuser portion only through a hole surrounded by the annular inclined surface.

When the gas generator is operated, combustion gas containing a combustion residue generated in the combustion chamber flows into the diffuser portion from the combustion chamber, and then some of the combustion gas is discharged from the gas discharge port after passing through the cylindrical filter. At this time, the combustion residue is trapped by the cylindrical main body of the cylindrical filter.

Further, the rest of the combustion gas containing the combustion residue and having flowed into the diffuser portion collides with an inner surface (surface facing the space surrounded by the cylindrical main body of the cylindrical filter) of the annular inclined surface of the cylindrical filter. At this time, the combustion residue contained in the combustion gas is trapped by the annular inclined surface, also trapped after entering, together with the combustion gas, the trapping space for trapping a combustion residue from the hole (an inlet of the trapping space) surrounded by the annular inclined surface to collide with the bottom surface of the diffuser portion, and further trapped between an outer surface (surface facing the trapping space) of the annular inclined surface and the bottom surface, whereby the combustion residue is held as-is in the trapping space.

The combustion gas having entered the trapping space exits the trapping space, and thereafter, the combustion residue that remained after a process, during which the combustion gas is discharged from the gas discharge port through the cylindrical filter, is trapped again. However, even if the combustion gas is discharged from the trapping space, the combustion residue trapped in the trapping space does not easily flow out from the inlet of the trapping space due to the annular inclined surface.

Thus, in the gas generator according to the present invention, a larger amount of combustion residue can be trapped than in a case where only the cylindrical filter is employed as a means for trapping a combustion residue, and thus, it is possible to significantly reduce the amount of combustion residue discharged from the gas discharge port.

That is, the gas generator according to the present invention has a structure in which the trapping space is formed at a site where the flow of the combustion gas flowing in the axial direction is changed by the presence of a collision surface. Therefore, the gas generator has a structure in which the trapping space is formed on a side of the bottom surface of the diffuser portion, and the combustion gas flows into the diffuser portion from a side of the opening that faces the trapping space. The aspects described below also have this feature.

The gas generator according to the second aspect is the same as the gas generator according to the first aspect except that a form of the trapping space, for trapping a combustion residue in this aspect is different from that in the first aspect.

The trapping space for trapping a combustion residue is a space surrounded by a recess formed on the inner surface of the bottom surface of the diffuser portion and an annular surface.

The annular surface is formed by being extended radially inward from the first annular end face of the cylindrical filter.

The recess formed in the bottom surface of the diffuser portion is formed at a center of the bottom surface of the diffuser portion. A boundary part between the recess of the diffuser portion and the peripheral wall is an annular step part forming a part of the bottom surface, and the first annular end face of the cylindrical filter abuts against the annular step part. The annular surface of the cylindrical filter is disposed such that an inner peripheral edge of the annular surface protrudes further inward than the inner peripheral surface (annular step part) of the recess thereby covering the recess. Therefore, an inner diameter of the recess is larger than an inner diameter of a hole formed by the inner peripheral edge of the annular surface of the cylindrical filter.

The annular surface of the cylindrical filter is formed by being extended radially inward, and thus, the trapping space for trapping a combustion residue surrounded by the annular surface and the recess communicates with the interior of the diffuser portion only through the hole (an inlet of the trapping space) surrounded by the annular surface.

When the gas generator is operated, combustion gas containing a combustion residue generated in the combustion chamber flows into the diffuser portion from the combustion chamber, and then some of the combustion gas is discharged from the gas discharge port after passing through the cylindrical filter. At this time, the combustion residue is trapped by the cylindrical main body of the cylindrical filter.

Further, the rest of the combustion gas containing the combustion residue and having flowed into the diffuser portion collides with an inner surface (surface facing the space surrounded by the cylindrical main body of the cylindrical filter) of the annular surface of the cylindrical filter. At this time, the combustion residue in the combustion gas is trapped by the annular surface, also trapped after entering, together with the combustion gas, the trapping space for trapping a combustion residue from the hole (inlet of the trapping space) of the annular surface to collide with the bottom surface of the diffuser portion, and further trapped between the outer surface (surface facing the trapping space) of the annular surface and the bottom surface, whereby the combustion residue is held as-is in the trapping space.

The combustion gas having entered the trapping space exits the trapping space, and thereafter, the combustion residue that remained after a process, during which the combustion gas is discharged from the gas discharge port through the cylindrical filter, is trapped again. However, even if the combustion gas is discharged from the trapping space, the combustion residue trapped in the trapping space does not easily flow out from the inlet of the trapping space due to the annular surface.

Thus, in the gas generator according to the present invention, a larger amount of combustion residue can be trapped than in a case where only the cylindrical filter is employed as a means for trapping a combustion residue, and thus, it is possible to significantly reduce the amount of combustion residue discharged from the gas discharge port.

The gas generator according to the third aspect is the same as the gas generator according to the first aspect except that a form of the trapping space for a combustion residue in the third aspect is different from that in the first aspect.

In the gas generator according to the third aspect, a size of a mesh-like formed body disposed to abut against the inner peripheral surface on a side of the first annular end face of the cylindrical filter defines the trapping space.

The mesh-like formed body to be used has a density smaller than a density of the cylindrical filter, and combustion gas easily enters this mesh-like formed body. The mesh-like formed body to be used is formed of a wire material or a mesh material made of metal such as stainless steel, iron, or copper. The mesh-like formed body forming the trapping space may be a formed body that is integrally formed with the cylindrical filter, as long as the mesh-like formed body has a density smaller than a density of the cylindrical filter, and combustion gas easily enters the mesh-like formed body.

When the gas generator is operated, combustion gas containing a combustion residue generated in the combustion chamber flows into the diffuser portion from the combustion chamber, and then some of the combustion gas is discharged from the gas discharge port after passing through the cylindrical filter. At this time, the combustion residue is trapped by the cylindrical main body of the cylindrical filter.

Further, the rest of the combustion gas containing the combustion residue and having flowed into the diffuser portion enters the mesh-like formed body, and the combustion residue is trapped by both the mesh-like formed body and the bottom surface.

The combustion gas having entered the mesh-like formed body exits the mesh-like formed body, and thereafter, the combustion residue that remained after a process, during which the combustion gas is discharged from the gas discharge port through the cylindrical filter, is trapped again. However, even if the combustion gas is discharged from the mesh-like formed body, the combustion residue captured and trapped by the mesh-like formed body does not easily flow out.

Thus, in the gas generator according to the present invention, a larger amount of combustion residue can be trapped than in a case where only the cylindrical filter is employed as a means for trapping a combustion residue, and thus, it is possible to significantly reduce the amount of combustion residue discharged from the gas discharge port.

The gas generator according to the fourth aspect is the same as the gas generator according to the third aspect except that a form of the trapping space, for a combustion residue in the fourth aspect is different from that in the third aspect.

The trapping space for a combustion residue is provided with a space surrounded by the bottom surface of the diffuser portion and a dome body.

The dome body has a hemispherical shape or a shape equivalent to the hemispherical shape, and includes a large number of through holes. Each of the through holes is of sufficient size allowing combustion gas containing a combustion residue to pass therethrough. The dome body is preferably made of stainless steel or iron.

When the gas generator is operated, combustion gas containing a combustion residue generated in the combustion chamber flows into the diffuser portion from the combustion chamber, and then some of the combustion gas is discharged from the gas discharge port after passing through the cylindrical filter. At this time, the combustion residue is trapped by the cylindrical main body of the cylindrical filter.

Further, the rest of the combustion gas containing the combustion residue and having flowed into the diffuser portion collides with an outer surface of the dome body. At this time, the combustion residue is trapped by the outer surface of the dome body, also trapped after entering the trapping space for trapping a combustion residue from the through hole of the dome body to collide with the bottom surface of the diffuser portion, and further trapped between the inner surface (inner surface facing the trapping space) of the dome body and the bottom surface of the dome body. Eventually, the combustion residue is held as-is in the trapping space.

The combustion gas having entered the trapping space exits the trapping space through the through hole of the dome body, and thereafter, the combustion residue that remained after a process, during which the combustion gas is discharged from the gas discharge port through the cylindrical filter, is trapped again. However, even if the combustion gas is discharged from the trapping space, the combustion residue trapped in the trapping space does not easily flow out from the trapping space due to the dome body.

Thus, in the gas generator according to the present invention, a larger amount of combustion residue can be trapped than in a case where only the cylindrical filter is employed as a means for trapping a combustion residue, and thus, it is possible to significantly reduce the amount of combustion residue discharged from the gas discharge port.

The gas generator according to the first to fourth aspects preferably has a configuration in which the igniter is attached to the first end of the cylindrical housing, the diffuser portion is coupled to the second end axially opposite to the first end, and the combustion chamber filled with the gas generating agent is disposed in the internal space of the cylindrical housing.

Among the gas generators A, B, and C described above, the gas generator A is suitable as the gas generator according to the present invention.

The gas generator according to the present invention can significantly reduce the amount of combustion residue discharged from the gas discharge port by trapping the combustion residue contained in the combustion gas generated by combustion of the gas generating agent serving as a gas generation source.

The gas generator according to the present invention can be utilized for a gas generator for an airbag device mounted in an automobile.

DESCRIPTION OF EMBODIMENTS (1) Gas Generator 1 in FIG. 1

An igniter 15 that is same as an igniter used in a known gas generator is attached to an opening at a first end 11 of a cylindrical housing 10.

Note that an enhancer chamber filled with an enhancing agent may be provided between the igniter 15 and a combustion chamber 20, as necessary. The enhancer chamber may be formed, for example, by arranging a cup-shaped partition wall including a gas passage hole.

A gas generating agent 21 that is same as a gas generating agent used in a known gas generator is housed in the combustion chamber 20.

In the embodiment illustrated in FIG. 1, a cup member 30 is disposed on a side of a diffuser portion 40, but the cup member 30 may not be provided in the embodiment.

The cup member 30 includes a cup member bottom surface 31, a cup member peripheral wall 32, a cup member opening 33, and a cup member flange part 34, and the cup member peripheral wall 32 includes a plurality of first gas passage holes 32a. The first gas passage holes 32a are sized to not allow the gas generating agent 21 enter therethrough.

With the use of the cup member flange part 34, the cup member 30 is fixed in the cylindrical housing 10, with the flange part 34 abutting against the diffuser portion 40.

The diffuser portion 40 is attached on a side of a second end 12 of the cylindrical housing 10, to close an opening on the side of the second end 12 of the cylindrical housing 10. The diffuser portion 40 has a cup shape including a bottom surface 41, a peripheral wall 42, an opening 43, a flange part 44 formed in the opening 43, and a step part 45 formed in the flange part 44. A plurality of gas discharge ports 42a are formed in the peripheral wall 42.

In the embodiment illustrated in FIG. 1, an annular plate 50 is disposed at the step part 45 of the flange part 44 of the diffuser portion 40, and welded and fixed to the step part 45. The annular plate 50 includes a single second gas passage hole 51 in the center of the annular plate 50.

The second gas passage hole 51 communicates only with an internal space 52 surrounded by a cylindrical main body 61 of a cylindrical filter 60. Therefore, the whole combustion gas is supplied to the internal space 52 surrounded by the cylindrical main body 61. A sealing tape is bonded to the second gas passage hole 51 from a side of the diffuser portion 40 for moisture prevention.

In the diffuser portion 40, the cylindrical filter 60 covering, from the inside of the diffuser portion 40, the gas discharge port 42a is disposed. The cylindrical filter 60 may abut against the peripheral wall 42 formed with the gas discharge port 42a, and may be disposed at a distance from the peripheral wall 42 formed with the gas discharge port 42a. The same applies to embodiments of FIGS. 2 to 4 below.

In the cylindrical filter 60, a first annular end face 61a of the cylindrical main body 61 abuts against an inner surface of the bottom surface 41 of the diffuser portion and a second annular end face 61b axially opposite to the first annular end face 61a abuts against the annular plate 50 located on a side of the opening 43 of the diffuser portion.

The cylindrical filter 60 further includes an annular inclined surface 62 extending in an obliquely inward direction from the first annular end face 61a.

A space surrounded by the bottom surface 41 of the diffuser portion and the annular inclined surface 62 is a trapping space 65, and a hole at the center of the annular inclined surface 62 is an inlet 66 of the trapping space.

The inlet 66 of the trapping space 65 and the single second gas passage hole 51 of the annular plate 50 are aligned, in central axis, with each other and face each other in the axial direction of the housing 10, hence, combustion gas containing a combustion residue and having entered through the second gas passage hole 51 the internal space 52 surrounded by the cylindrical main body 61 of the cylindrical filter 60 more easily enters the trapping space 65 from the inlet 66.

Next, an operation when the gas generator 1 illustrated in FIG. 1 is used as a gas generator for an airbag device will be described.

When the igniter 15 is activated, the gas generating agent 21 in the combustion chamber 20 is ignited and burned to generate combustion gas. The combustion gas generated in the combustion chamber 20, together with a high-temperature combustion residue (molten metal component) contained therein, enters the internal space 52 surrounded by the cylindrical main body 61 in the diffuser portion 40 after passing through only the first gas passage holes 32a of the cup member 30 and the second gas passage hole 51 of the annular plate 50.

Some of the combustion gas containing the combustion residue and having entered the internal space 52 is discharged from the gas discharge port 42a after passing through the cylindrical filter 60 (cylindrical main body 61). At this time, the combustion residue is trapped by the cylindrical filter 60.

The rest of the combustion gas containing the combustion residue and having flowed into the internal space 52 collides with the outer surface of an annular inclined surface 62 of the cylindrical filter, and the combustion residue is trapped.

Since the combustion gas containing the combustion residue can more easily enter the trapping space 65 for trapping the combustion residue 65 from the inlet 66 of the trapping space, the combustion residue is trapped after colliding with the bottom surface 41 of the diffuser portion, and further, the combustion residue is trapped also between the outer surface (surface facing the trapping space 65) of the annular inclined surface 62 and the bottom surface 41. Eventually, the combustion residue is held as-is in the trapping space 65.

The combustion gas having entered the trapping space 65 exits from the trapping space 65, and thereafter, the combustion residue that remained after a process, during which the combustion gas is discharged from the gas discharge port 42a through the cylindrical filter 60 (cylindrical main body 61), is trapped. However, when the combustion gas is discharged from the trapping space, the combustion residue cannot easily flow out from the inlet 66 of the trapping space 65 due to the annular inclined surface 62.

Thus, in the gas generator 1 according to the embodiment of the present invention, a larger amount of combustion residue can be trapped than in a case where only the cylindrical filter is employed as a means for trapping a combustion residue, hence, it is possible to significantly reduce the amount of the combustion residue that is discharged from the gas discharge port.

2. Gas Generator in FIG. 2

Figure 2:
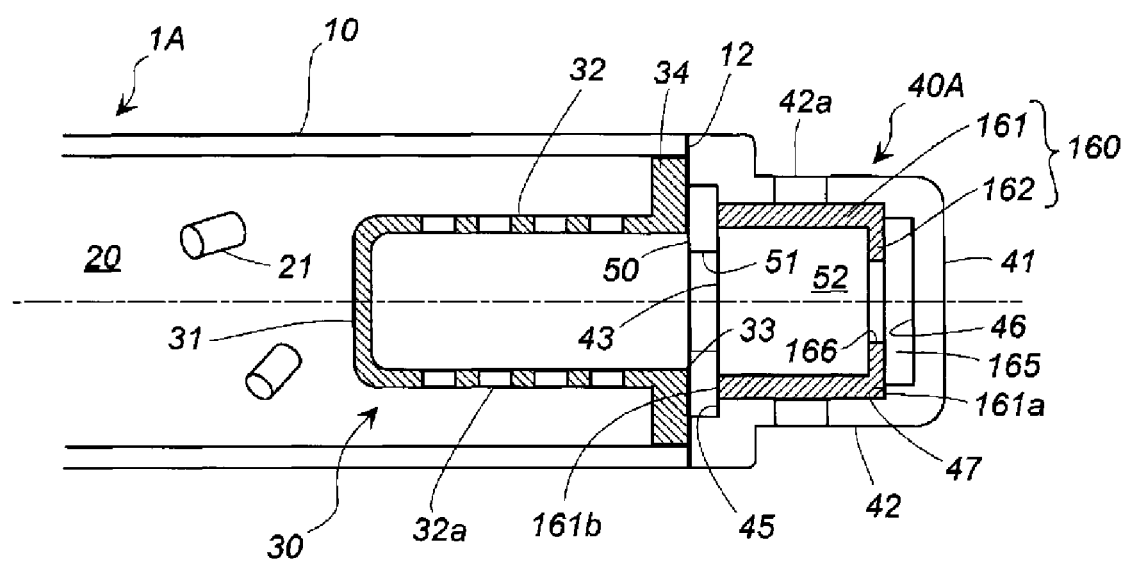
FIG. 2 is a partial cross-sectional view of a gas generator according to another embodiment different from the embodiment illustrated in FIG. 1.

A gas generator 1A in FIG. 2 is the same as the gas generator 1 in FIG. 1 except that a configuration of the trapping space for a combustion residue in FIG. 2 is different from that in FIG. 1.

A diffuser portion 40A includes the bottom surface 41, the peripheral wall 42 with a gas discharge port 42a, and the opening 43, and has a cup shape including a recess 46 at the center of the inner surface of the bottom surface 41.

A recess step part (annular step part) 47 is formed between the peripheral wall 42 and the recess 46.

In the diffuser portion 40, a cylindrical filter 160 covering, from the inside of the diffuser 40A, the gas discharge port 42a is disposed. In the cylindrical filter 160, a first annular end face 161a of a cylindrical main body 161 abuts against the recess step part 47, a second annular end face 161b axially opposite to the first annular end face 161a abuts against the annular plate 50 located on the side of the opening 43 of the diffuser portion, and an annular surface 162 extending radially inward from the first annular end face 161a is provided. An inner peripheral edge of the annular surface 162 protrudes further inward than the inner peripheral surface of the recess 46.

A space surrounded by the recess 46 formed on the bottom surface 41 of the diffuser portion and the annular surface 162 is a trapping space 165, and a hole at the center of the annular surface 162 is an inlet 166 of the trapping space. The inlet 166 of the trapping space 165 and the single second gas passage hole 51 of the annular plate 50 are aligned, in central axis, with each other and face each other in the axial direction of the housing 10, hence combustion gas containing a combustion residue and having entered through the second gas passage hole 51 the internal space 52 surrounded by the cylindrical main body 161 of the cylindrical filter 160 more easily enters the trapping space 165 from the inlet 166.

Next, an operation when the gas generator 1A illustrated in FIG. 2 is used as a gas generator for an airbag device will be described. Note that parts that are not illustrated in FIG. 2 but are the same as those in FIG. 1 will be described according to FIG. 1.

When the igniter 15 is activated, the gas generating agent 21 in the combustion chamber 20 is ignited and burned to generate combustion gas. The combustion gas generated in the combustion chamber 20 contains a combustion residue, and enters the internal space 52 surrounded by the cylindrical main body 161 in the diffuser portion 40 after passing through the first gas passage holes 32a of the cup member 30 and the second gas passage hole 51 of the annular plate 50.

Some of the combustion gas containing the combustion residue and having entered the internal space 52 is discharged from the gas discharge port 42a after passing through the cylindrical filter 160 (cylindrical main body 161). At this time, the combustion residue is trapped by the cylindrical filter 160 (cylindrical main body 161).

The rest of the combustion gas containing the combustion residue and having flowed into the internal space 52 collides with the outer surface of the annular surface 162 of the cylindrical filter, and the combustion residue is trapped by the annular surface 162.

Since the combustion gas containing the combustion residue can more easily enter the trapping space 165 for trapping a combustion residue from the inlet 166 of the trapping space, the combustion residue is trapped after colliding with the bottom surface 41 (recess 46) of the diffuser portion, and further, the combustion residue is trapped also between the outer surface of the annular surface 162 (surface facing the trapping space 165) and the bottom surface 41. Eventually, the combustion residue is held as-is in the trapping space 165.

The combustion gas having entered the trapping space 165 exits from the trapping space 165, and thereafter, the combustion residue that remained after a process, during which the combustion gas is discharged from the gas discharge port 42a through the cylindrical filter 160 (cylindrical main body 161), is trapped. However, when the combustion gas is discharged from the trapping space, the combustion residue cannot easily flow out from the inlet 166 of the trapping space 165 due to the annular surface 162.

Thus, in the gas generator 1A according to the embodiment of the present invention, a larger amount of combustion residue can be trapped than in a case where only the cylindrical filter is employed as a means for trapping a combustion residue, hence, it is possible to significantly reduce the amount of the combustion residue discharged from the gas discharge port.

Figure 3:
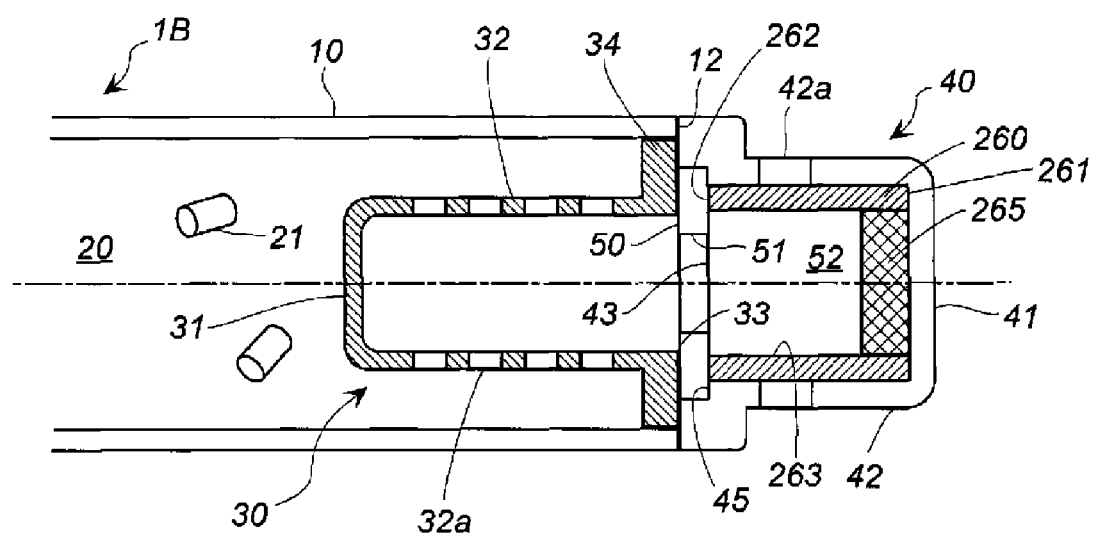
FIG. 3 is a partial cross-sectional view of a gas generator according to another embodiment different from each of the embodiments illustrated in FIG. 1 and FIG. 2.

(3) Gas Generator including Cup-Shaped Partition Wall in FIG. 3

A gas generator 1B in FIG. 3 is the same as the gas generator 1 in FIG. 1 except that a configuration of the trapping space for trapping a combustion residue in FIG. 3 is different from that in FIG. 1.

In a cylindrical filter 260, a first annular end face 261 abuts against the bottom surface 41 of the diffuser portion and a second annular end face 262 axially opposite to the first annular end face 261 abuts against the annular plate 50 located on the side of the opening 43 of the diffuser portion.

A mesh-like formed body 265 is disposed abutting against the bottom surface 41 of the diffuser portion and an inner peripheral surface 263 on a side of the first annular end face 261 of the cylindrical filter 260. The mesh-like formed body 265 is a formed body, which is made of a laminated body of iron mesh and has a density smaller than a density of the cylindrical filter 260, and traps a combustion residue by adhering the combustion residue to the mesh-like formed body 265. A size of the mesh-like formed body 265 defines the trapping space for a combustion residue.

The mesh-like formed body 265 defining the trapping space and the single second gas passage hole 51 of the annular plate 50 are aligned, in central axis, with each other and face each other in the axial direction of the housing 10, and thus, combustion gas containing a combustion residue and having entered the internal space 52 surrounded by the cylindrical filter 260 after passing through the second gas passage hole 51 can more easily enter the mesh-like formed body 265.

Next, an operation when the gas generator 1B illustrated in FIG. 3 is used as a gas generator for an airbag device will be described. Note that parts that are not illustrated in FIG. 3 but are the same as those in FIG. 1 will be described according to FIG. 1.

When the igniter 15 is activated, the gas generating agent 21 in the combustion chamber 20 is ignited and burned to generate combustion gas. The combustion gas generated in the combustion chamber 20 contains a combustion residue, and enters the internal space 52 surrounded by the cylindrical filter 260 in the diffuser portion 40 after passing through the first gas passage holes 32*a* of the cup member 30 and the second gas passage hole 51 of the annular plate 50.

Some of the combustion gas containing the combustion residue and having entered the internal space 52 is discharged from the gas discharge port 42*a* after passing through the cylindrical filter 260. At this time, the combustion residue is trapped by the cylindrical filter 260.

Since the rest of the combustion gas containing the combustion residue and having flowed into the internal space 52 can more easily enter the mesh-like formed body 265, the combustion residue is trapped by the mesh-like formed body 265. The combustion gas having entered the mesh-like formed body (trapping space) 265 exits the mesh-like formed body 265, and thereafter, the combustion residue that remained after a process, during which the combustion gas is discharged from the gas discharge port 42*a* through the cylindrical filter 260, is trapped. However, when the combustion gas is discharged from the mesh-like formed body 265, the combustion residue adheres to the mesh-like formed body 265, which prevents the combustion residue from easily flowing out.

Thus, in the gas generator 1B according to the embodiment of the present invention, a larger amount of combustion residue can be trapped than in a case where only the cylindrical filter is employed as a means for trapping a combustion residue, and thus, it is possible to significantly reduce the amount of the combustion residue discharged from the gas discharge port.

Figure 4:
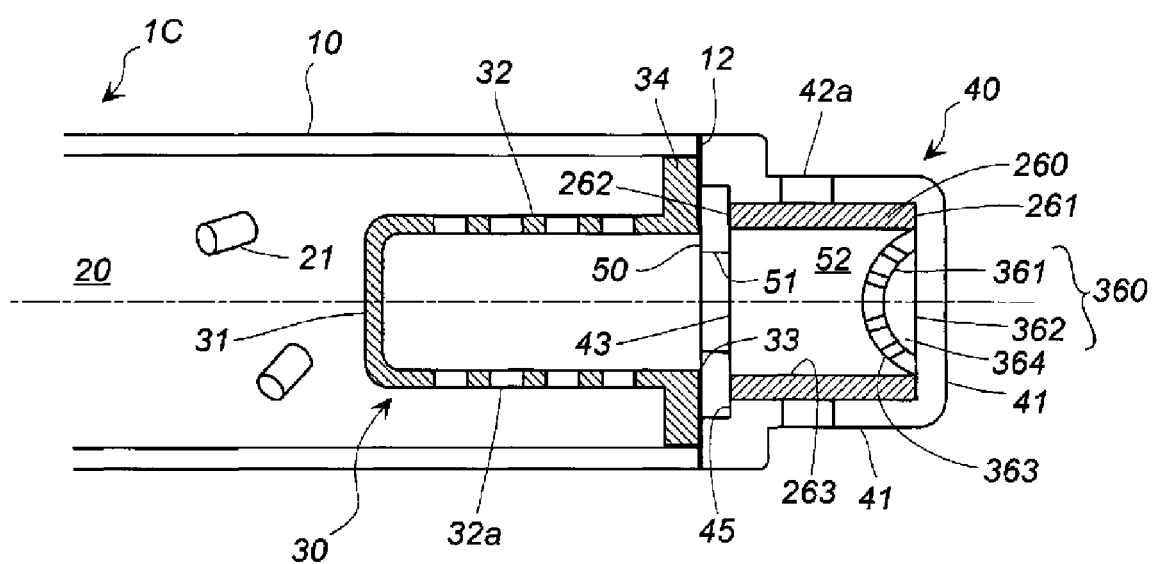
FIG. 4 is a partial cross-sectional view of a gas generator according to another embodiment different from each of the embodiments illustrated in FIG. 1 to FIG. 3.

(4) Gas Generator in FIG. 4

A gas generator 1C in FIG. 4 is the same as the gas generator 1B in FIG. 3 except that a dome body 360 is used in FIG. 4 in place of the mesh-like formed body 265 in FIG. 3.

The dome body 360 is disposed inside the cylindrical filter 260 of the diffuser portion 40. The dome body 360 includes a domed part 361 including a plurality of through holes 363 and an opening 362. The dome body 360 is made of iron. The domed part 361 of the dome body 360 faces the inside of the diffuser portion 40, and a lower end of the domed part 361 connecting the opening 362 abuts against the inner peripheral surface 263 on the side of the first annular end face 261 of the cylindrical filter 260.

A space surrounded by the dome body 360 and the bottom surface 41 of the diffuser portion is a trapping space 364. The dome body 360 defining the trapping space and the single second gas passage hole 51 of the annular plate 50 are aligned, in central axis, with each other and face each other in the axial direction of the housing 10, hence, the combustion gas containing the combustion residue and having entered the internal space 52 surrounded by the cylindrical filter 260 after passing through the second gas passage hole 51 collides with the dome body 360 and can more easily enter the trapping space 364 from the through holes 363.

Next, an operation when the gas generator 1C illustrated in FIG. 4 is used as a gas generator for an airbag device will be described. Note that parts that are not illustrated in FIG. 4 but are the same as those in FIG. 1 will be described according to FIG. 1.

When the igniter 15 is activated, the gas generating agent 21 in the combustion chamber 20 is ignited and burned to generate combustion gas. The combustion gas generated in the combustion chamber 20 contains a combustion residue, and enters the internal space 52 in the diffuser portion 40 after passing through the first gas passage holes 32*a* of the cup member 30 and the second gas passage hole 51 of the annular plate 50.

Some of the combustion gas containing the combustion residue and having entered the internal space 52 is discharged from the gas discharge port 42*a* after passing through the cylindrical filter 260. At this time, the combustion residue is trapped by the cylindrical filter 260.

The rest of the combustion gas containing the combustion residue and having flowed into the internal space 52 collides with an outer surface of the domed part 361, and the combustion residue is trapped by the outer surface of the domed part 361.

Further, since the combustion gas containing the combustion residue and having flowed into the internal space 52 can more easily enter the trapping space 364 for trapping a combustion residue from the through holes 363 of the domed part, the combustion residue is trapped after colliding with the bottom surface 41 of the diffuser portion, and also trapped between the inner surface (inner surface facing the trapping space 364) of the domed part 361 and the bottom surface 41. Eventually, the combustion residue is held as-is in the trapping space 364.

The combustion gas having entered the trapping space 364 exits the trapping space 364, and thereafter, the combustion residue that remained after a process, during which the combustion gas is discharged from the gas discharge port 42*a* after passing through the cylindrical filter 260, is trapped. However, when the combustion gas is discharged from the trapping space, the combustion residue cannot easily flow out of the trapping space 364 due to the domed part 361

Thus, in the gas generator 1C according to the embodiment of the present invention, a larger amount of combustion residue can be trapped than in a case where only the cylindrical filter is employed as a means for trapping a combustion residue, and thus, it is possible to significantly reduce the amount of the combustion residue discharged from the gas discharge port.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. A gas generator, comprising:
an igniter provided in a cylindrical housing of the gas generator;
a combustion chamber filled with a gas generating agent to be ignited and burned by the igniter, and being provided within the cylindrical housing; and
a diffuser portion including a gas discharge port for discharging combustion gas generated in the combustion chamber being coupled to the cylindrical housing,
the diffuser portion having a cup shape and including a bottom surface, a peripheral wall having the gas discharge port, and an opening, the diffuser portion including therein a cylindrical filter covering, from an inside of the diffuser portion, the gas discharge port,
the cylindrical filter being disposed such that a first annular end face thereof abuts against the bottom surface of the diffuser portion and a second annular end face thereof axially opposite to the first annular end face is located to be on a side of the opening of the diffuser portion, the cylindrical filter having an annular inclined surface extending in an obliquely inward direction from the first annular end face; and
a trapping space for trapping a combustion residue contained in the combustion gas being provided so as to be surrounded by the bottom surface of the diffuser portion and the annular inclined surface.

2. The gas generator according to claim 1, wherein the igniter is attached to a first end of the cylindrical housing, the diffuser portion is formed at a second end axially opposite to the first end, and the combustion chamber filled with the gas generating agent is disposed in an internal space of the cylindrical housing.

3. A gas generator, comprising:
an igniter provided in a cylindrical housing of the gas generator;
a combustion chamber filled with a gas generating agent to be ignited and burned by the igniter, and being provided within the cylindrical housing; and
a diffuser portion including a gas discharge port for discharging combustion gas generated in the combustion chamber being coupled to the cylindrical housing,
the diffuser portion having a cup shape and including a bottom surface, a peripheral wall having the gas discharge port, and an opening, the diffuser portion further including a recess on an inner surface of the bottom surface, the diffuser portion including therein a cylindrical filter covering, from an inside of the diffuser portion the gas discharge port,
the cylindrical filter being disposed such that a first annular end face thereof abuts against the bottom surface of the diffuser portion and a second annular end face thereof axially opposite to the first annular end face is located to be on a side of the opening of the diffuser portion, the cylindrical filter including an annular surface extending radially inward from the first annular end face, and the annular surface including an inner peripheral edge that protrudes further inward than an inner peripheral surface of the recess;
a trapping space for trapping a combustion residue contained in the combustion gas being provided so as to be surrounded by the recess formed on the bottom surface of the diffuser portion and the annular surface.

4. The gas generator according to claim 3, wherein the igniter is attached to a first end of the cylindrical housing, the diffuser portion is formed at a second end axially opposite to the first end, and the combustion chamber filled with the gas generating agent is disposed in an internal space of the cylindrical housing.

5. A gas generator, comprising:
an igniter provided in a cylindrical housing of the gas generator;
a combustion chamber filled with a gas generating agent to be ignited and burned by the igniter, and being provided within the cylindrical housing; and
a diffuser portion including a gas discharge port for discharging combustion gas generated in the combustion chamber being coupled to the cylindrical housing,
the diffuser portion having a cup shape and including a bottom surface, a peripheral wall having the gas discharge port, and an opening, the diffuser portion including therein a cylindrical filter covering, from an inside of the diffuser portion, the gas discharge port,
the cylindrical filter being disposed such that a first annular end face thereof abuts against the bottom surface of the diffuser portion and a second annular end face thereof axially opposite to the first annular end face is located to be on a side of the opening of the diffuser portion;
a mesh-like formed body disposed to abut against an inner peripheral surface on a side of the first annular end face of the cylindrical filter, the mesh-like formed body having a density smaller than a density of the cylindrical filter and forming a trapping space for trapping a combustion residue contained in the combustion gas.

6. The gas generator according to claim 5, wherein the igniter is attached to a first end of the cylindrical housing, the diffuser portion is formed at a second end axially opposite to the first end, and the combustion chamber filled with the gas generating agent is disposed in an internal space of the cylindrical housing.

7. A gas generator, comprising:
an igniter provided in a cylindrical housing of the gas generator;
a combustion chamber filled with a gas generating agent to be ignited and burned by the igniter, and being provided within the cylindrical housing; and
a diffuser portion including a gas discharge port for discharging combustion gas generated in the combustion chamber being coupled to the cylindrical housing,
the diffuser portion having a cup shape and including a bottom surface, a peripheral wall having the gas discharge port, and an opening, the diffuser portion including therein a cylindrical filter covering, from an inside of the diffuser portion, the gas discharge port,
the cylindrical filter being disposed such that a first annular end face thereof abuts against the bottom surface of the diffuser portion and a second annular end face thereof axially opposite to the first annular end face is located to be on a side of the opening of the diffuser portion;
a dome body including an opening and a domed part formed with a plurality of through holes being provided such that the domed part faces inward of the diffuser portion and a lower end connecting the opening abuts against an inner peripheral surface on a side of the first annular end face of the cylindrical filter; and a trapping space for trapping a combustion residue contained in the combustion gas being provided so as to be surrounded by the bottom surface of the diffuser portion and the dome body.

8. The gas generator according to claim 7, wherein the igniter is attached to a first end of the cylindrical housing, the diffuser portion is formed at a second end axially opposite to the first end, and the combustion chamber filled with the gas generating agent is disposed in an internal space of the cylindrical housing.

\* \* \* \* \*